(12) United States Patent
Vasquez et al.

(10) Patent No.: US 10,107,935 B2
(45) Date of Patent: Oct. 23, 2018

(54) NON-RADIOACTIVE TRACER MATERIALS FOR MONITORING TREATMENT FLUIDS IN SUBTERRANEAN FORMATIONS

(71) Applicant: Halliburton Energy Services, Inc., Houston, TX (US)

(72) Inventors: Quintilio Vasquez, Al Khobar (SA); Julio Estuardo Vasquez, Richmond, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/542,774

(22) PCT Filed: Mar. 11, 2015

(86) PCT No.: PCT/US2015/019967
§ 371 (c)(1),
(2) Date: Jul. 11, 2017

(87) PCT Pub. No.: WO2016/144355
PCT Pub. Date: Sep. 15, 2016

(65) Prior Publication Data
US 2018/0011215 A1    Jan. 11, 2018

(51) Int. Cl.
*E21B 47/10*    (2012.01)
*G01V 5/10*    (2006.01)

(52) U.S. Cl.
CPC .............. *G01V 5/101* (2013.01); *E21B 47/10* (2013.01)

(58) Field of Classification Search
CPC ................................ E21B 47/10; G01V 5/101
See application file for complete search history.

(56) References Cited

U.S. PATENT DOCUMENTS

| 2,810,076 | A | 10/1957 | Mardock |
| 3,019,341 | A | 1/1962 | Monaghan |
| 4,731,531 | A | 3/1988 | Handke |
| 5,182,051 | A | 1/1993 | Bandy et al. |

(Continued)

FOREIGN PATENT DOCUMENTS

EP    0234731 A1    9/1987

OTHER PUBLICATIONS

Barree, R. D., M. K. Fisher, and R. A. Woodroof. "A practical guide to hydraulic fracture diagnostic technologies." SPE Annual Technical Conference and Exhibition. Society of Petroleum Engineers, 2002.

(Continued)

*Primary Examiner* — Mark R Gaworecki
(74) *Attorney, Agent, or Firm* — Craig Roddy; Baker Botts L.L.P.

(57) ABSTRACT

Wellbore treatment compositions comprising non-radioactive tracer materials and methods for using the non-radioactive tracer materials to determine the location of treatment fluids within a subterranean formation are provided herein. A method comprising introducing a treatment fluid comprising a non-radioactive tracer material into a subterranean formation; exposing a portion of the subterranean formation to neutrons from a neutron source to activate the non-radioactive tracer material in the portion of the subterranean formation; and detecting gamma rays emitted by the activated tracer material in the portion of the subterranean formation.

17 Claims, 3 Drawing Sheets

(56) References Cited

U.S. PATENT DOCUMENTS

| | | | |
|---|---|---|---|
| 5,783,822 A | 7/1998 | Buchanan et al. | |
| 6,064,063 A | 5/2000 | Mickael | |
| 6,552,333 B1 | 4/2003 | Storm et al. | |
| 6,725,926 B2 | 4/2004 | Nguyen et al. | |
| 8,234,072 B2 | 7/2012 | Smith, Jr. et al. | |
| 8,392,120 B2 * | 3/2013 | McDaniel | E21B 43/26 166/250.01 |
| 8,658,968 B2 | 2/2014 | Galford | |
| 8,759,748 B2 | 6/2014 | Navarro-Sorroche | |
| 2009/0090505 A1 | 4/2009 | McDaniel et al. | |
| 2009/0277630 A1 * | 11/2009 | McDaniel | E21B 43/26 166/250.1 |
| 2011/0198488 A1 * | 8/2011 | Stoller | G01V 5/102 250/258 |
| 2012/0031613 A1 | 2/2012 | Green | |
| 2013/0032339 A1 * | 2/2013 | Kalia | E21B 43/16 166/250.01 |
| 2013/0341012 A1 | 12/2013 | Belani et al. | |
| 2016/0097274 A1 * | 4/2016 | Duphorne | E21B 47/1015 250/260 |
| 2016/0209391 A1 * | 7/2016 | Zhang | G01N 33/2847 |
| 2017/0285219 A1 * | 10/2017 | Brady | G01V 5/102 |

OTHER PUBLICATIONS

Fox, P. E., G. Adnyiana, and I. Setiadi. "Applications of Carbon/Oxygen Logging in Indonesian Reservoirs." SPE Asia Pacific Oil and Gas Conference and Exhibition. Society of Petroleum Engineers, 1999.

Jacobson, L. A., R. Ethridge, and G. Simpson. "A new small-diameter, high-performance reservoir monitoring tool." SPWLA 39th Annual Logging Symposium. Society of Petrophysicists and Well-Log Analysts, 1998.

Truax, Jerome A., et al. "Field experience and results obtained with an improved carbon/oxygen logging system for reservoir optimization." SPWLA 42nd Annual Logging Symposium. Society of Petrophysicists and Well-Log Analysts, 2001.

International Search Report and Written Opinion issued in related PCT Application No. PCT/US2015/019967 dated Nov. 24, 2015, 14 pages.

International Preliminary Report on Patentability issued in related PCT Application No. PCT/US2015/019967 dated Sep. 12, 2017, 12 pages.

* cited by examiner

NON-RADIOACTIVE TRACER MATERIALS FOR MONITORING TREATMENT FLUIDS IN SUBTERRANEAN FORMATIONS

CROSS-REFERENCE TO RELATED APPLICATION

The present application is a U.S. National Stage Application of International Application No. PCT/US2015/019967 filed Mar. 11, 2015, which is incorporated herein by reference in its entirety for all purposes.

BACKGROUND

The present disclosure relates to methods and compositions for monitoring treatment fluids in subterranean formations.

Treatment fluids can be used in a variety of subterranean operations to increase and/or improve hydrocarbon (e.g., oil and gas) recovery. As used herein, the terms "treat," "treatment," "treating," and grammatical derivatives thereof refer to any subterranean operation that uses a fluid in conjunction with achieving a desired function and/or for a desired purpose. Use of these terms does not imply any particular action by the treatment fluid. Illustrative subterranean operations can include, for example, conformance operations, sand control operations, fracturing operations, gravel packing operations, acidizing operations, scale dissolution and removal operations, cementing operations, drilling operations, and the like.

When performing subterranean operations, it is often desirable to monitor the wellbore and the subterranean formation surrounding it. Knowledge of the distribution and placement of treatment fluids and other materials in the wellbore and subterranean formation provides valuable information. In some cases, tracers are mixed into such treatment fluids in order to detect the location of the treatment fluids. Several techniques have been utilized for determining the location of treatment fluids in subterranean formations. Examples of known techniques include using radioactive tracer materials, temperature logs, production logging tools, and thermal neutron capture cross section.

BRIEF DESCRIPTION OF THE DRAWINGS

These drawings illustrate certain aspects of some of the embodiments of the present disclosure, and should not be used to limit or define the claims.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

Illustrative embodiments of the present disclosure are described in detail herein. In the interest of clarity, not all features of an actual implementation may be described in this specification. It will of course be appreciated that in the development of any such actual embodiment, numerous implementation specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

The present disclosure relates to methods and compositions for monitoring treatment fluids in subterranean formations. More particularly, the present disclosure relates to wellbore treatment compositions comprising non-radioactive tracer materials and methods for using the non-radioactive tracer materials to determine the location of treatment fluids within a subterranean formation.

Treatment fluids may be utilized in various subterranean operations, among other reasons, to increase and/or improve hydrocarbon recovery from a subterranean formation. Optimum treatment fluid placement and complete zonal coverage are often important for successfully treating a wellbore within the subterranean formation. Thus, monitoring the location of a treatment fluid within a wellbore and the surrounding subterranean formation may be useful for optimizing the treatment and/or confirming that the treatment fluid successfully reaches and/or remains in a desire portion of the wellbore.

Several techniques exist for determining the location of treatment fluids in subterranean formations including using radioactive tracer materials, temperature logs, production logging tools, and thermal neutron capture cross section. These existing techniques have several disadvantages including, but not limited to, time-sensitivity, limitation to pre-selected zones of a wellbore, imprecision due to effects of wellbore conditions (e.g., temperature), and/or hazards in handling or use. Radioactive tracer materials, in particular, have long half-lives and as a result are essentially continuously radioactive. Such continuously radioactive tracer materials are often expensive and/or considered hazardous. Thus, the radioactive tracer materials and the fluids containing them must be handled and disposed of in accordance with the laws and rules relating to hazardous materials.

The present disclosure provides methods and compositions for determining the location of treatment fluids within a subterranean formation using a non-radioactive tracer material. In the methods of the present disclosure, a treatment fluid comprising a non-radioactive tracer material may be introduced into a subterranean formation, for example, via a wellbore penetrating at least a portion of the subterranean formation. The portion of the subterranean formation where the radioactive tracer material is believed or intended to be located may be exposed to neutrons from a neutron source. The neutrons may activate the non-radioactive tracer material thus causing the activated tracer material to emit detectable rays (e.g., gamma rays) for a period of time. As used herein, the terms "activate," "activating," and grammatical derivatives thereof refer to inducing radioactivity. The gamma rays emitted by the non-radioactive tracer material may be detected, for example, using a gamma ray detector.

Without limiting the disclosure to any particular theory or mechanism, it is believed that the non-radioactive tracer materials of the present disclosure are normally non-radioactive, but may become radioactive for a short period of time when exposed to neutrons thereby emitting detectable gamma rays that may be used to determine the location of treatment fluids comprising the non-radioactive tracer materials within a subterranean formation. It is further believed that the non-radioactive tracer materials of the present disclosure may remain in the subterranean formation for extended periods of time (e.g., several years) with minimal safety and/or environmental concerns and may be repeatedly exposed to neutrons over the life of a wellbore to continually monitor the location of the treatment fluids.

Among the many potential advantages to the methods and compositions of the present disclosure, only some of which are alluded to herein, the methods and compositions of the present disclosure may provide a substantially non-hazardous and environmentally safe method for determining the location of treatment fluids in subterranean formations. Thus, the methods and compositions of the present disclosure may allow for extended monitoring of treatment fluids in subterranean formations for extended periods of time (e.g., several years) with minimal safety concerns and also may reduce or eliminate the time and expense of complying with the laws and rules related to hazardous materials. The methods and compositions of the present disclosure also may allow for a precise determination of the location of a treatment fluid within a subterranean formation without being affected by wellbore conditions (e.g., temperature) or constrained to pre-selected zones of the wellbore. Thus, the methods and compositions of the present disclosure may allow for the detection of a treatment fluid regardless of its location in a subterranean formation, thereby reducing uncertainty regarding the placement of the wellbore treatment, which may minimize or eliminate the need to repeat the wellbore treatment.

In certain embodiments, a treatment fluid comprising a non-radioactive tracer material may be introduced into a subterranean formation. Depending on the type of treatment to be performed, the treatment fluid may comprise any treatment fluid known in the art. Treatment fluids that may be useful in accordance with the present disclosure include, but are not limited to, lost circulation fluids, stimulation fluids (e.g., a fracturing fluids or an acid stimulation fluids), completion fluids, conformance fluids (e.g., water or gas shutoff fluids), sand control fluids (e.g., formation or proppant consolidating fluids), cement fluids, drilling fluids, workover fluids, and/or any combination thereof. The treatment fluids of the present disclosure may be used for treating a portion of the subterranean formation to accomplish a number of purposes including, but not limited to, to facilitate the recovery of desirable hydrocarbons from the formation.

The treatment fluids that may be useful in accordance with the present disclosure may comprise any base fluid known in the art, including aqueous base fluids, non-aqueous base fluids, and any combinations thereof. The term "base fluid" refers to the major component of the fluid (as opposed to components dissolved and/or suspended therein), and does not indicate any particular condition or property of that fluids such as its mass, amount, pH, etc. Aqueous base fluids that may be suitable for use in the methods and systems of the present disclosure may comprise water from any source. Such aqueous base fluids may comprise fresh water, salt water (e.g., water containing one or more salts dissolved therein), brine (e.g., saturated salt water), seawater, or any combination thereof. In most embodiments of the present disclosure, the aqueous base fluids comprise one or more ionic species, such as those formed by salts dissolved in water. For example, seawater and/or produced water may comprise a variety of divalent cationic species dissolved therein. In certain embodiments, the density of the aqueous base fluid can be adjusted, among other purposes, to provide additional particulate transport and suspension in the compositions of the present disclosure. In certain embodiments, the pH of the aqueous base fluid may be adjusted (e.g., by a buffer or other pH adjusting agent) to a specific level, which may depend on, among other factors, the types of viscosifying agents, acids, and other additives included in the fluid. One of ordinary skill in the art, with the benefit of this disclosure, will recognize when such density and/or pH adjustments are appropriate. Examples of non-aqueous base fluids that may be suitable for use in the methods and systems of the present disclosure include, but are not limited to oils, hydrocarbons, organic liquids, and the like. In certain embodiments, the treatment fluids may comprise a mixture of one or more fluids and/or gases, including but not limited to emulsions, foams, and the like.

The treatment fluids used in accordance with the methods of the present disclosure optionally may comprise any number of additives. Examples of such additional additives include, but are not limited to, salts, surfactants, acids, proppant particulates, diverting agents, fluid loss control additives, tracking chemicals, gas, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, additional $H_2S$ scavengers, $CO_2$ scavengers, oxygen scavengers, lubricants, additional viscosifiers, breakers, weighting agents, relative permeability modifiers, sealants, resins, wetting agents, coating enhancement agents, filter cake removal agents, antifreeze agents (e.g., ethylene glycol), and the like. Such additives also may affect the selection of a surfactant as such additives may have an effect on the characteristics of the treatment fluid.

The non-radioactive tracer materials used in the methods and compositions of the present disclosure may comprise any non-radioactive material that becomes activated when exposed to neutrons and that emits detectable rays (e.g., gamma rays) over a relatively short time period once activated. The non-radioactive tracer materials used in the methods and compositions of the present disclosure should be compatible with the treatment fluid such that the non-radioactive tracer materials do not significantly adversely affect the treatment fluid and/or its ability to achieve its desired function and/or purpose. In certain embodiments, the non-radioactive tracer materials used in the methods and compositions of the present disclosure may have relatively high neutron absorption cross-sections such that the gamma rays emitted by the non-radioactive tracer materials have sufficient energy to reach the gamma ray detector.

In certain embodiments, the non-radioactive tracer material may comprise one or more non-radioactive elements and/or derivatives thereof. In certain embodiments, the non-radioactive tracer material may comprise one or more elements from Groups I to VIII of the Periodic Table of the Elements, the elements of the lanthanide series of the Periodic Table of the Elements, any derivatives thereof (e.g., oxides, phosphates, carbonates, and salts), and/or any combinations thereof. Examples of such non-radioactive elements include, but are not limited to, aluminum, barium, beryllium, cadmium, cerium, chromium, cobalt, copper, dysprosium, erbium, europium, gadolinium, gold, holmium, iodine, iridium, lanthanum, lead, lutetium, magnesium, manganese, molybdenum, neodymium, nickel, phosphorous, praseodymium, promethium, rhenium, samarium, silver, technetium, terbium, thulium, Titanium, tungsten, vanadium, ytterbium, zinc, any derivative thereof (e.g., oxides, phosphates, carbonates, and salts), and/or any combination thereof. In certain embodiments, the non-radioactive tracer material may be present in the treatment fluid in an amount from about 50 ppm to about 500 ppm. In certain embodiments, the non-radioactive tracer material may be presented in the treatment fluid in an amount from about 0.1 percent to about 0.5 percent by volume of the treatment fluid. In certain embodiments, the activated tracer material may return to an inactive (e.g., non-radioactive) state after emitting the gamma rays. In certain embodiments, the activated tracer materials may return to an inactive state within about 5 seconds to about 3 days after being activated. In certain embodiments, the activated tracer materials may return to an inactive state within about 5 seconds to about 3 hours after being activated. In certain embodiments, the half-life of the activated tracer material may be long enough for the gamma rays emitted by the activated tracing material to be detected. In certain embodiments, the half-life of the activated tracer material may be from about 5 seconds to about 3 hours. In certain embodiments, the half-life of the activated tracer material may be from about 5 seconds to about 5 minutes.

In certain embodiments, a neutron source may be introduced into at least a portion of the subterranean formation. In certain embodiments, the portion of the subterranean formation may be exposed to neutrons from the neutron source. In such embodiments, the portion of the subterranean formation exposed to neutrons may be where the radioactive tracer is believed or intended to be located. In certain embodiments, the treatment fluid may be allowed to achieve its desired function and/or purpose in the subterranean formation before the subterranean formation is exposed to the neutrons. In certain embodiments, the neutrons may contact the non-radioactive tracer material within the subterranean formation and may activate the non-radioactive tracer material thus causing the activated tracer material to emit detectable rays (e.g., gamma rays).

In certain embodiments, the neutron source may comprise any neutron source known in the art that produces a neutron output in the energy range required to cause the activation of the non-radioactive tracer material and the emission of detectable gamma rays by the activated tracer material. The neutron sources that may be used in accordance with the present disclosure may comprise a chemical source of neutron-emitting radioisotopes or an electronic source that emits either continuous streams of neutrons or controlled duration bursts of neutrons. Examples of neutron sources that may be suitable for use in the methods of the present disclosure include, but are not limited to, a plutonium-beryllium source, an americium-beryllium source, a polonium-beryllium source, a spontaneous fission neutron source such as californium 252, or a generator source such as one that produces deuterium-tritium (D-T) neutrons.

In certain embodiments, the neutron source may be disposed in or on a neutron well logging instrument. The neutron well logging instruments used in accordance with the present disclosure may be any neutron well logging instrument known in the art that contains a source of neutrons and/or one or more gamma ray detectors. Examples of such neutron well logging instruments include, but are not limited to, neutron porosity and elemental analysis tools typically using an americium-beryllium (Am—Be) neutron source and neutron capture and carbon/oxygen (C/O) tools typically using 14.1-MeV neutrons from deuterium-tritium (D-T) accelerators. Examples of commercially available neutron well logging instruments are RMT™i and TMD3D™, available from Halliburton Energy Services, Inc., Houston, Tex.

In certain embodiments, one or more gamma ray detectors may be introduced into the portion of the subterranean formation that was exposed to the neutrons. In certain embodiments, the gamma ray detector may detect the gamma rays emitted from the activated tracer material. The gamma ray detectors that may be used in accordance with the present disclosure may be any gamma ray detector known in the art that is capable of providing an energy spectrum of the gamma rays emitted from the activated tracer material. Examples of gamma ray detectors that may be suitable for use in the methods of the present disclosure include, but are not limited to, sodium iodide (NaI) scintillation detectors, bismuth germanate (BGO) scintillation detectors, lanthanum bromine (LaBr) scintillation detectors, gadolinium oxyorthosilicate (GSO) scintillation detectors, and gadolinium yttrium oxyorthosilicate (GYSO) scintillation detectors. In certain embodiments, the gamma ray detector may count radiation events including, but not limited to, inelastic gamma rays, epithermal or thermal neutrons, capture gamma rays, background gamma rays, and the like. In certain embodiments, one or more gamma ray detectors may be located at selected distances away from the neutron source on the neutron well logging instrument. For example, in certain embodiments, the neutron well logging instrument may include a "near" gamma ray detector, a "far" gamma ray detector, and/or a "long" gamma ray detector, so named due to their relative proximity to the neutron source.

Figure 1:
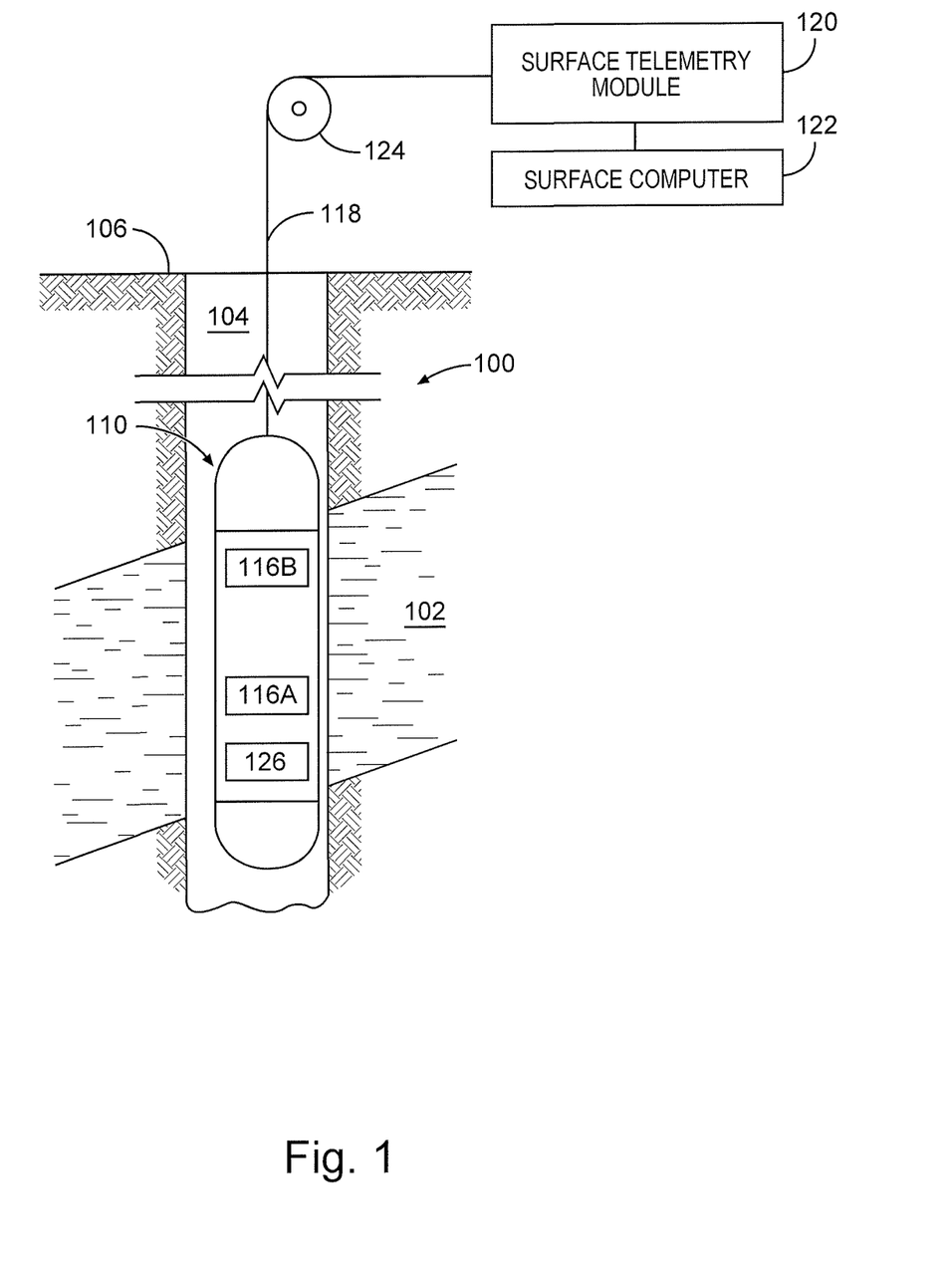
FIG. 1 is a diagram illustrating a nuclear well logging instrument in wellbore penetrating a subterranean formation in accordance with certain embodiments of the present disclosure.

FIG. 1 shows a nuclear well logging instrument 110 in a well 100 located in a portion of a subterranean formation of interest 102 surrounding a wellbore 104 in accordance with certain embodiments of the present disclosure. In certain embodiments, the nuclear well logging instrument 110 may be introduced into the wellbore 104 from the surface 106 by means of a wire line 118. In certain embodiments, the neutron well logging instrument 110 may comprise a neutron source 126 and/or one or more gamma ray detectors 116A, 116B. In certain embodiments, the neutron well logging instrument 110 may include a "near" gamma ray detector 116A and a "far" gamma ray detector 116B located at selected distances away from the neutron source 126. Although shown above the neutron source 126 in FIG. 1, one or more of the gamma ray detectors 116A, 116B may be located below the neutron source 126 on the neutron well logging instrument 110. In certain embodiments, the neutron well logging instrument 110 may be raised and/or lowered within the wellbore 104 using the wire line 118, and the depth of the neutron well logging instrument 110 may be determined by a depth measurement system 124 (illustrated as a depth wheel). In certain embodiments, the wire line 118 may communicatively couple the neutron well logging instrument 110 to a surface telemetry module 120 and/or a surface computer 122.

Figure 2A:
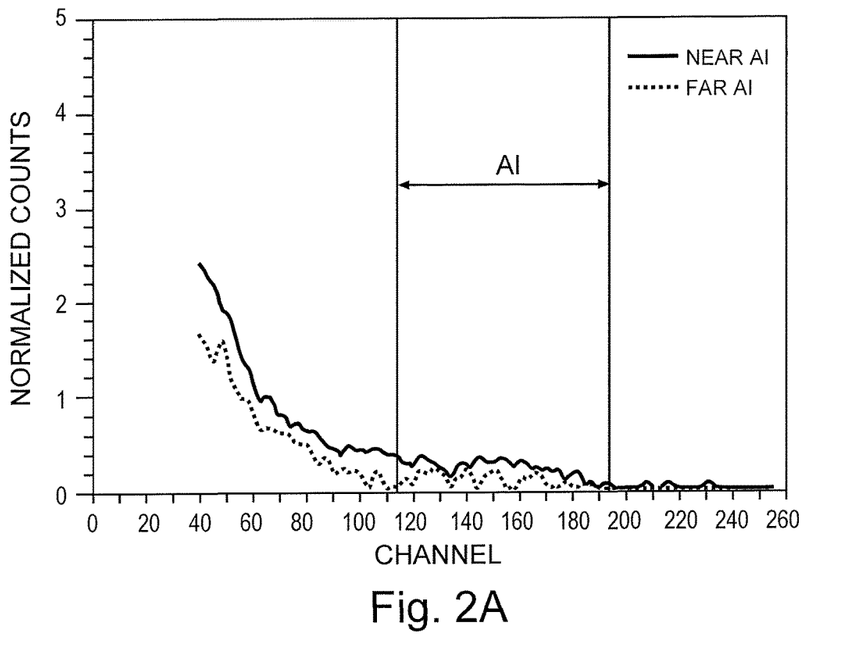
FIG. 2A is a graph illustrating a background energy spectrum of a portion of a subterranean formation generated in accordance with certain embodiments of the present disclosure.
Figure 2B:
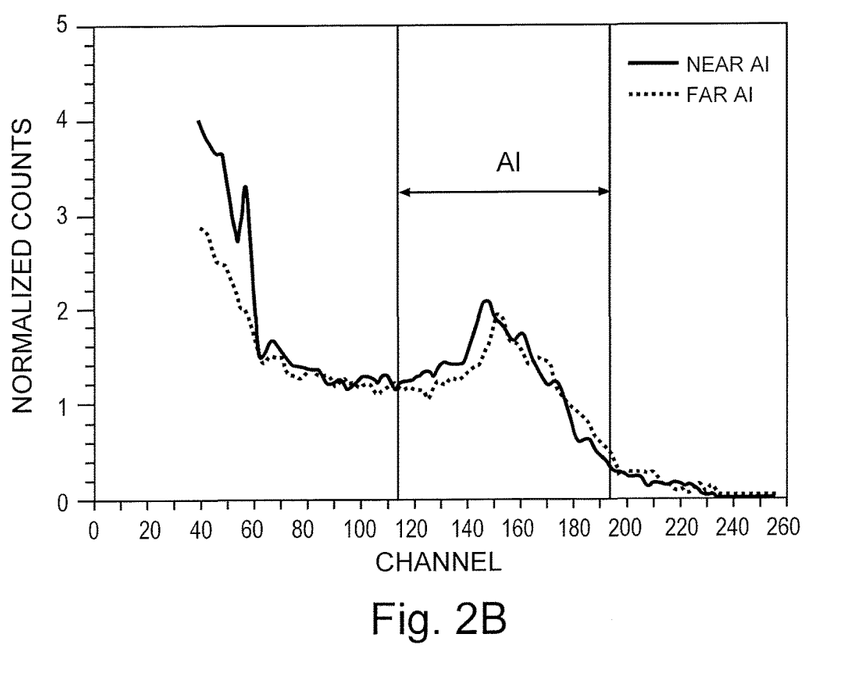
FIG. 2B is a graph illustrating an energy spectrum of a portion of a subterranean formation generated after exposing the portion of the subterranean formation to neutrons in accordance with certain embodiments of the present disclosure.

In certain embodiments, the location of the non-radioactive tracer material, and thus the location of the treatment fluid, may be determined based, at least in part, on the detected gamma rays emitted by the activated tracer material. In certain embodiments, the gamma ray detectors 116A, 116B may quantify the number (e.g., normalized count) and the energy of the gamma rays detected in a particular portion of the subterranean formation 102. In certain embodiments, the gamma ray detectors 116A, 116B may relay the quantified information to the surface computer 122 by way of the surface telemetry module 120. In certain embodiments, an energy spectrum of the particular portion of a subterranean formation may be generated from the detected gamma rays emitted by the activated tracer material. In certain embodiments, the spectrum may show the normalized count of gamma rays detected having various energies. For example, FIG. 2B shows a graph illustrating an energy spectrum of a portion of a subterranean formation 102 generated after exposing the portion of the subterranean formation to neutrons in accordance with certain embodiments of the present disclosure. The x-axis of the graph in FIG. 2B represents the energies of the detected gamma rays, and the y-axis of the graph in FIG. 2B represents the normalized count of gamma rays detected at each energy.

In certain embodiments, a background energy spectrum of the same or similar portion of the subterranean formation 102 may be generated before the non-radioactive tracer material is introduced into the subterranean formation 102 and/or while the non-radioactive tracer material located therein is not activated. For example, FIG. 2A shows a graph illustrating a background energy spectrum of the portion of a subterranean formation 102 generated in accordance with certain embodiments of the present disclosure. The x-axis of the graph in FIG. 2A represents the energies of the detected gamma rays, and the y-axis of the graph in FIG. 2A represents the normalized count of gamma rays detected at each energy. In some embodiments, the background energy spectrum may show gamma rays emitted by naturally occurring materials in the wellbore (e.g., shale, sandstone, and the like).

In certain embodiments, the two energy spectra generated for a particular portion of the subterranean formation may be compared to determine whether the non-radioactive tracer material is present in that particular portion of the subterranean formation 102. In certain embodiments, the energies of the gamma rays emitted by the activated tracer material may have a known energy range, hereinafter referred to as the "activation indicator range" or the "AI range." In certain embodiments, the two energy spectra may be compared by analyzing whether the energy spectrum generated after exposing the portion of the subterranean formation 102 to neutrons (e.g., FIG. 2B) shows an increase in the normalized count of gamma rays having energies in the AI range as compared to the background energy spectrum (e.g., FIG. 2A). In certain embodiments, an increase in the gamma ray counts detected in the AI range of the energy spectrum generated after exposing the portion of the subterranean formation to neutrons (e.g., FIG. 2B) as compared to the background energy spectrum (e.g., FIG. 2A) may indicate the presence of the non-radioactive tracer material in that portion of the subterranean formation. For example, the normalized count of gamma rays detected in the AI range is greater in FIG. 2B as compared to FIG. 2A, which may indicate the presence of the non-radioactive tracer material, and thus the presence of the treatment fluid comprising the non-radioactive tracer material, in that portion of the subterranean formation 102.

In certain embodiments, the activated tracer material may return to a stable, inactive (e.g., non-radioactive) state after emitting the gamma rays. In certain embodiments, the non-radioactive tracer material may remain in the subterranean formation for an extended time period. In certain embodiments, the non-radioactive tracer material may remain in the subterranean formation for several years. In certain embodiments, the non-radioactive tracer material may be activated multiple times over the extended period of time and thus the location of the treatment fluid comprising the non-radioactive tracer material may be monitored over the extended period of time.

The wellbore treatment compositions of the present disclosure may be prepared using any suitable method and/or equipment (e.g., blenders, mixers, stirrers, etc.) known in the art at any time prior to their use. The wellbore treatment compositions may be prepared at a well site or at an offsite location.

The present disclosure in some embodiments provides methods for using treatment fluids to carry out a variety of subterranean operations, including, but not limited to, lost circulation treatments, stimulation treatments (e.g., a fracturing treatment or an acid stimulation treatment), completion treatments, conformance treatments (e.g., water or gas shutoff treatments), sand control treatments (e.g., formation or proppant consolidating treatments), cementing treatments, drilling treatments, workover treatments, and/or any combination thereof. In some embodiments, the treatment fluids of the present disclosure may be used in treating a portion of a subterranean formation. In certain embodiments, a treatment fluid may be introduced into a subterranean formation. In some embodiments, the treatment fluid may be introduced into a wellbore that penetrates a subterranean formation. In some embodiments, the treatment fluid may be introduced into the subterranean formation using one or more pumps.

The methods and compositions of the present disclosure may be used during or in conjunction with any subterranean operation. For example, the methods and/or compositions of the present disclosure may be used in the course of a conformance treatment operation, which may be performed, among other reason, to improve sweep efficiency and/or reduce excessive water and/or gas co-production with hydrocarbons. Any known conformance fluid for use in conformance treatment operations may be used in the methods and compositions of the present disclosure. In certain embodiments, the conformance fluid may comprise a relative permeability modifier, a sealant, and/or any combination thereof.

Figure 3:
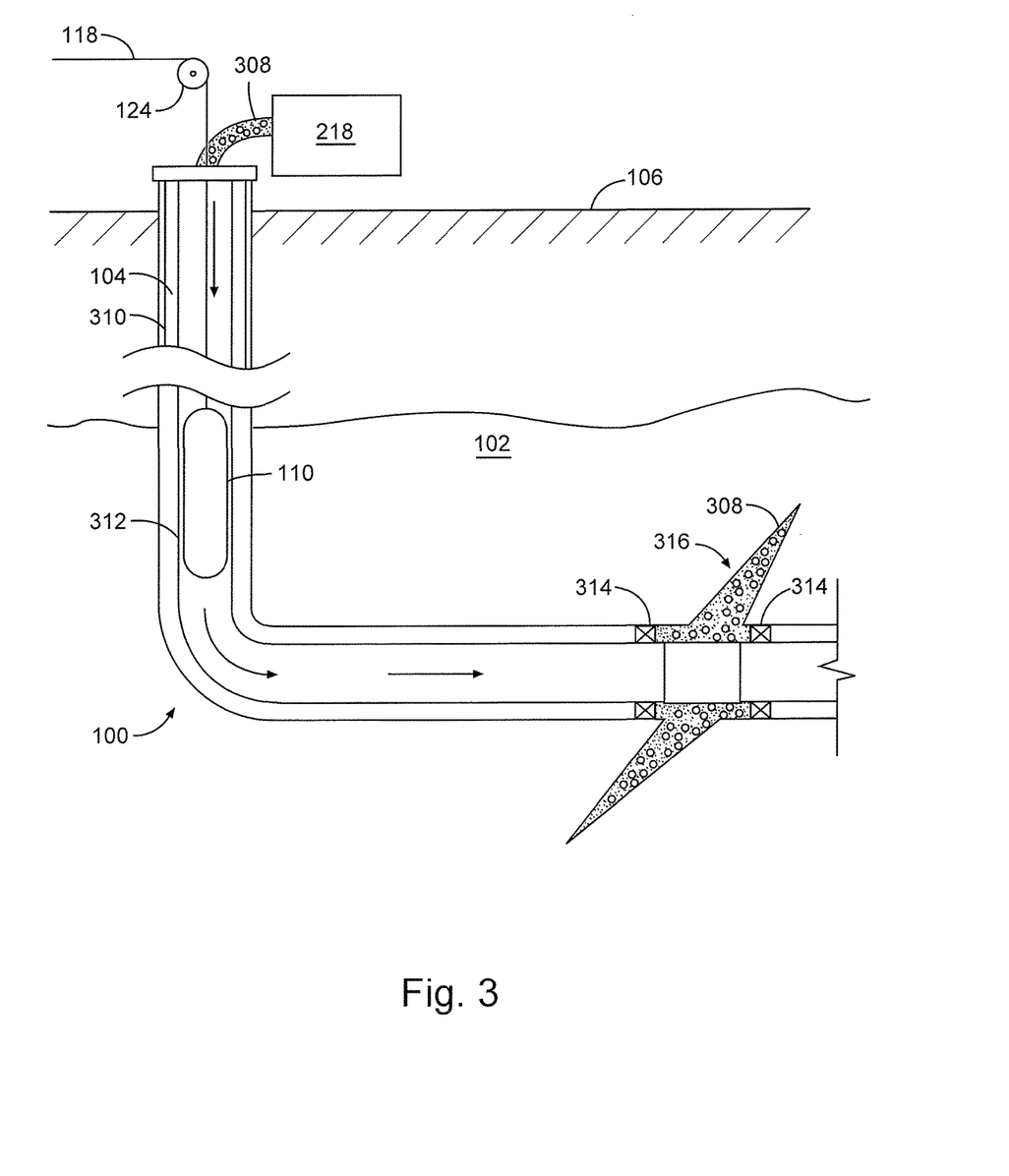
FIG. 3 is a diagram illustrating an example of a subterranean formation in which a conformance treatment operation may be performed in accordance with certain embodiments of the present disclosure.

FIG. 3 shows a well 100 during a conformance treatment operation in a portion of a subterranean formation of interest 102 surrounding a wellbore 104. The wellbore 104 extends from the surface 106, and the conformance fluid 308 is applied to a portion of the subterranean formation 102 surrounding the horizontal portion of the wellbore. Although shown as vertical deviating to horizontal, the wellbore 104 may include horizontal, vertical, slant, curved, and other types of wellbore geometries and orientations, and the conformance treatment may be applied to a subterranean zone surrounding any portion of the wellbore. The wellbore 104 can include a casing 310 that is cemented or otherwise secured to the wellbore wall. The wellbore 104 can be uncased or include uncased sections. Perforations can be formed in the casing 310 to allow conformance fluids and/or other materials to flow into the subterranean formation 102. In cased wells, perforations can be formed using shape charges, a perforating gun, hydro-jetting, slotted liner, and/or other tools. One or more fractures 316 may have been formed in formation 102, for example, in the course of a prior fracturing treatment.

The well 100 is shown with a work string 312 depending from the surface 106 into the wellbore 104. The pump and blender system 318 is coupled a work string 312 to pump the conformance fluid 308 into the wellbore 104. The working string 312 may include coiled tubing, jointed pipe, and/or other structures that allow fluid to flow into the wellbore 104. The working string 312 can include flow control devices, bypass valves, ports, and or other tools or well devices that control a flow of fluid from the interior of the working string 312 into the subterranean zone 102. For example, the working string 312 may include ports adjacent the wellbore wall to communicate the conformance fluid 308 directly into the subterranean formation 102, and/or the working string 312 may include ports that are spaced apart from the wellbore wall to communicate the conformance fluid 308 into an annulus in the wellbore between the working string 312 and the wellbore wall.

The working string 312 and/or the wellbore 104 may include one or more sets of packers 114 that seal the annulus between the working string 312 and wellbore 104 to define an interval of the wellbore 104 into which the conformance fluid 308 will be pumped. FIG. 3 shows two packers 314, one defining an uphole boundary of the interval and one defining the downhole end of the interval. When the conformance fluid 308 is introduced into wellbore 104 (e.g., in FIG. 3, the area of the wellbore 104 between packers 314), the permeability of one or more fractures 316 in the subterranean formation 102 to various fluids (e.g., water) may be modified.

In certain embodiments, the conformance fluid 308 may comprise a non-radioactive tracer material. As illustrated in FIG. 3, a neutron well logging instrument 110 may be introduced into the wellbore 104 where the radioactive tracer is believed or intended to be located. As shown in FIG. 1, the neutron well logging instrument 110 may comprise a neutron source 126 and one or more gamma ray detectors 116A, 116B. In certain embodiments, the wellbore 104 and/or the portion of the subterranean formation 102 in the near wellbore region may be exposed to neutrons from the neutron source 126. The neutrons may contact and activate the non-radioactive tracer material located the wellbore 104 and/or the portion of the subterranean formation 102 in the near wellbore region. The activated tracer material may emit detectable gamma rays for a relatively short period of time. The gamma ray detectors 116A, 116B may detect the gamma rays emitted from the activated tracer material.

As shown in FIG. 2B, an energy spectrum may be generated from the detected gamma rays emitted by the activated tracer material in the wellbore 104 and/or the portion of the subterranean formation 102. As shown in FIG. 2A, a background energy spectrum of the same or similar portion of a subterranean formation 102 also may be generated. The two energy spectra may be compared to determine whether the non-radioactive tracer material is present in the portion of the subterranean formation 102 by analyzing whether the normalized count of gamma rays detected within the AI range is greater in the spectrum generated after exposing the portion of the subterranean formation 102 to neutrons (e.g., FIG. 2B) as compared to the background spectrum (e.g., FIG. 2A).

The treatment fluids of the present disclosure also may directly or indirectly affect the various downhole or subterranean equipment and tools that can come into contact with the fluid during operation. Such equipment and tools can include wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components can be included in the systems and apparatuses generally described above.

While not specifically illustrated herein, the disclosed methods and compositions also may directly or indirectly affect any transport or delivery equipment used to convey the compositions to a system such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

An embodiment of the present disclosure is a method comprising: introducing a treatment fluid comprising a non-radioactive tracer material into a subterranean formation; exposing a portion of the subterranean formation to neutrons from a neutron source to activate the non-radioactive tracer material in the portion of the subterranean formation; and detecting gamma rays emitted by the activated tracer material in the portion of the subterranean formation.

Another embodiment of the present disclosure is a method comprising: introducing a conformance fluid comprising a non-radioactive tracer material into a subterranean formation; exposing a portion of the subterranean formation to neutrons from a neutron source to activate the non-radioactive tracer material in the portion of the subterranean formation; and detecting gamma rays emitted by the activated tracer material in the portion of the subterranean formation.

Another embodiment of the present disclosure is a wellbore treatment composition comprising: a treatment fluid; and a non-radioactive tracer material which is activated when exposed to neutrons and thereby emits detectable gamma rays.

To facilitate a better understanding of the present disclosure, the following examples of certain aspects of preferred embodiments are given. The following examples are not the only examples that could be given according to the present disclosure and are not intended to limit the scope of the disclosure or claims.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
   allowing a conformance treatment fluid comprising a non-radioactive tracer material to penetrate one or more fractures in a subterranean formation and modify the permeability of the one or more fractures;
   introducing a neutron source into a wellbore penetrating the subterranean formation to activate the non-radioactive tracer material in the one or more fractures; and
   detecting gamma rays emitted by the activated tracer material in the one or more fractures.

2. The method of claim 1 wherein the conformance treatment fluid is allowed to modify the permeability of the one or more fractures before introducing the neutron source into the wellbore.

3. The method of claim 1 further comprising determining whether the activated tracer material is present in the one or more fractures based at least in part on the detection of the gamma rays emitted by the activated tracer material.

4. The method of claim 1 further comprising generating an energy spectrum of the detected gamma rays.

5. The method of claim 1 wherein the non-radioactive tracer material comprises an element selected from the group consisting of: an element from Groups I to VIII of the Periodic Table of the Elements, an element from the lanthanide series of the Periodic Table of the Elements, any derivative thereof, and any combination thereof.

6. The method of claim 1 wherein the non-radioactive tracer material comprises an element selected from the group consisting of: aluminum, barium, beryllium, cadmium, cerium, chromium, cobalt, copper, dysprosium, erbium, europium, gadolinium, gold, holmium, iodine, iridium, lanthanum, lead, lutetium, magnesium, manganese, molybdenum, neodymium, nickel, phosphorous, praseodymium, promethium, rhenium, samarium, silver, technetium, terbium, thulium, Titanium, tungsten, vanadium, ytterbium, zinc, any derivative thereof, and any combination thereof.

7. The method of claim 1 wherein the non-radioactive tracer material is present in the conformance treatment fluid in an amount from about 0.1 percent to about 0.5 percent by volume of the conformance treatment fluid.

8. The method of claim 1 wherein the activated tracer material returns to an inactive state after emitting the detectable gamma rays.

9. The method of claim 1 wherein the activated tracer material has a half-life of from about 5 seconds to about 3 hours.

10. The method of claim 1 wherein detecting the gamma rays comprises introducing a gamma ray detector into the subterranean formation.

11. The method of claim 1 wherein the conformance treatment fluid is introduced into the subterranean formation using one or more pumps.

12. The method of claim 1 wherein the conformance treatment fluid further comprises at least one additive selected from the group consisting of: a relative permeability modifier, a sealant, and any combination thereof.

13. A wellbore treatment composition comprising:
    a conformance treatment fluid that comprises a relative permeability modifier or a sealant; and
    a non-radioactive tracer material which is activated when exposed to neutrons and thereby emits detectable gamma rays.

14. The composition of claim 13 wherein the non-radioactive tracer material comprises an element selected from the group consisting of: an element from Groups I to VIII of the Periodic Table of the Elements, an element from the lanthanide series of the Periodic Table of the Elements, any derivative thereof, and any combination thereof.

15. The composition of claim 13 wherein the non-radioactive tracer material is present in the wellbore treatment composition in an amount from about 0.1 percent to about 0.5 percent by volume of the conformance treatment fluid.

16. The composition of claim 13 wherein the activated tracer material returns to an inactive state after emitting the detectable gamma rays.

17. The composition of claim 13 wherein the activated tracer material has a half-life of from about 3 seconds to about 5 hours.

* * * * *